United States Patent [19]

Mattson et al.

[11] 4,191,209
[45] Mar. 4, 1980

[54] AIR FLOW SENSING DEVICE FOR AIR CONDITIONING SYSTEMS

[75] Inventors: Frank J. Mattson; John T. Lawler; Jack L. Stegall, all of Charlotte, N.C.; Kenneth R. Dawkins, Rock Hill, S.C.

[73] Assignee: Aeronca, Inc., Pineville, N.C.

[21] Appl. No.: 948,919

[22] Filed: Oct. 5, 1978

[51] Int. Cl.² ............................................. G01F 1/05
[52] U.S. Cl. .................................. 137/486; 73/194 R
[58] Field of Search .................. 73/194 R, 198, 199, 73/272 R, 205 R, 205 L, 212; 236/91 C, 92 R; 137/557, 486

[56] References Cited
U.S. PATENT DOCUMENTS

| 2,929,248 | 3/1960 | Sprenkle | 73/198 |
| 3,640,307 | 2/1972 | Drzala | 73/205 R X |

Primary Examiner—Jerry W. Myracle
Attorney, Agent, or Firm—Bell, Seltzer, Park & Gibson

[57] ABSTRACT

Inaccurate readings of the air flow in an air flow system obtained by an air flow sensor because of an uneven air velocity distribution at the sensor are reduced in accordance with the present invention by providing an air redirecting means in the air flow closely adjacent and upstream from the air flow sensor. The air redirecting means is mounted for movement in response to impingement thereon of an air flow having an uneven velocity distribution so as to redirect the air flow and provide a more representative air velocity condition at the sensor.

18 Claims, 6 Drawing Figures

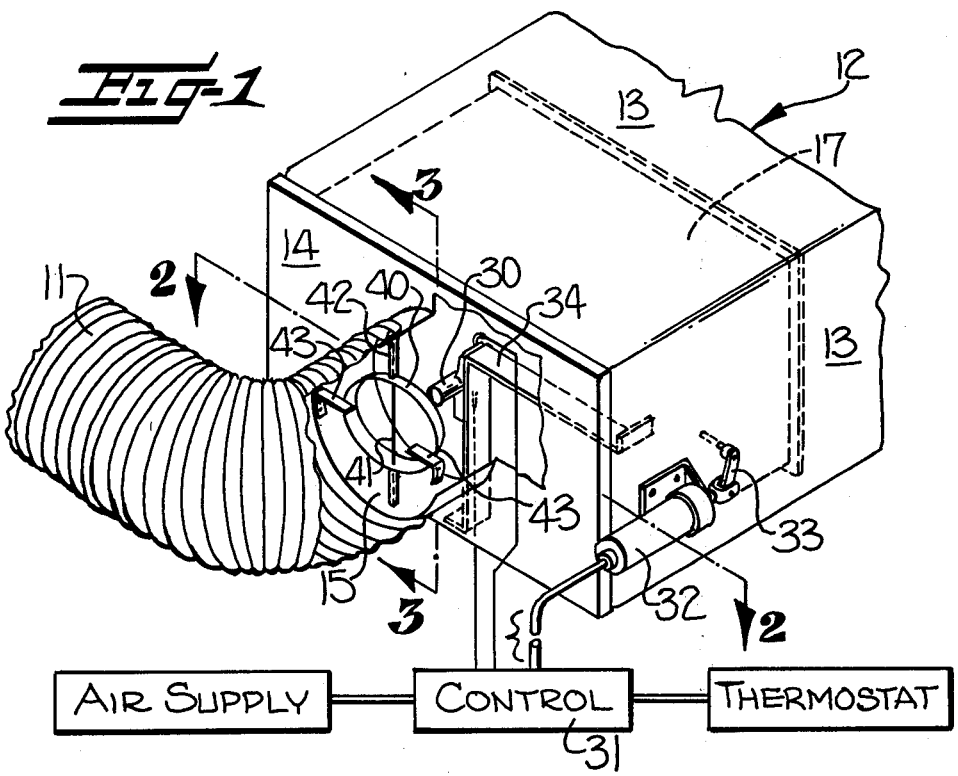
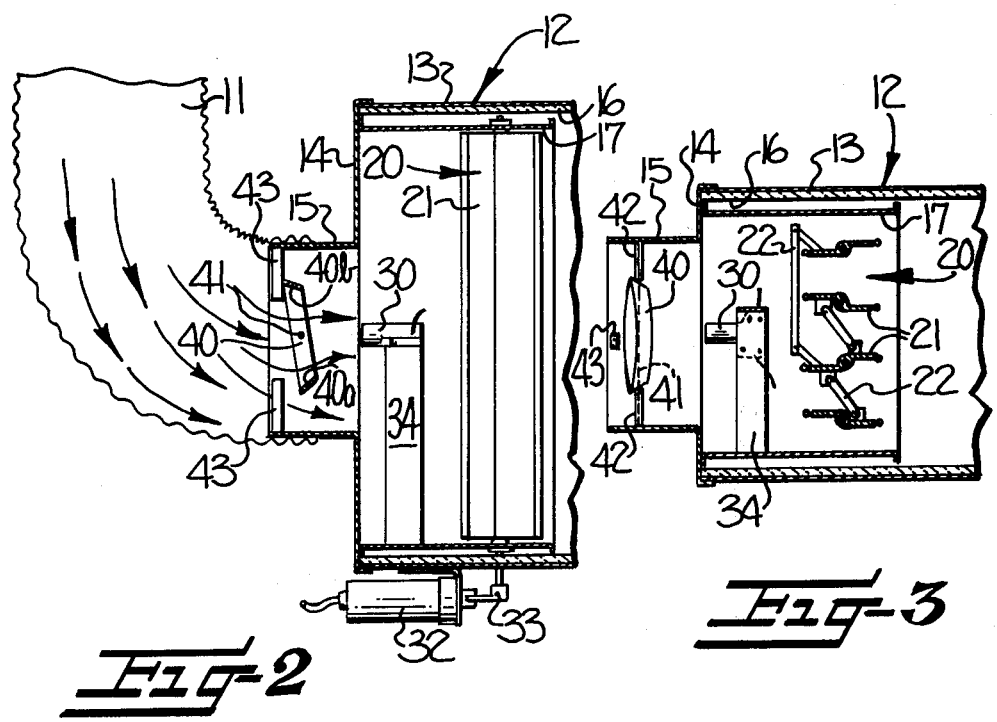

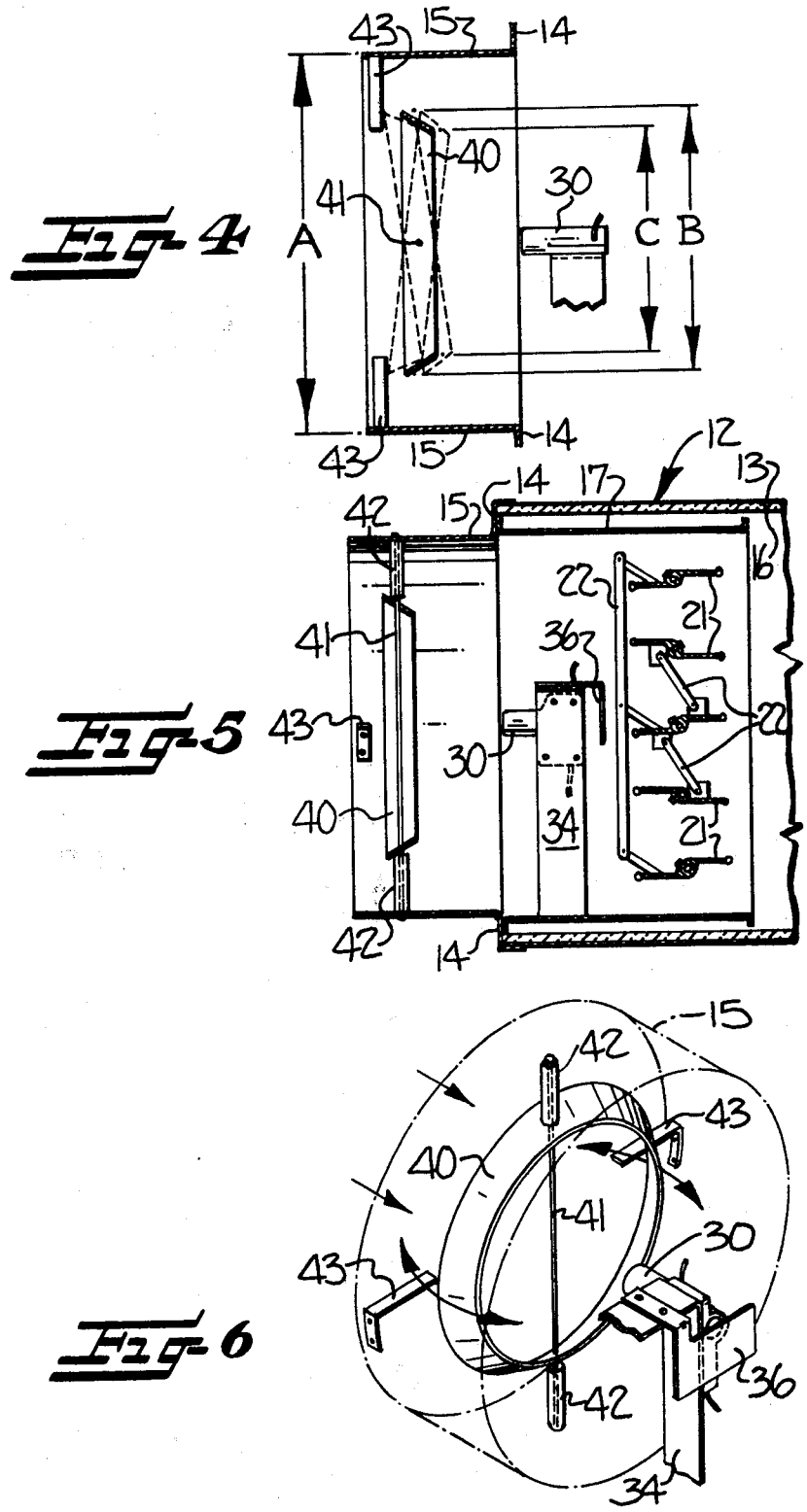

AIR FLOW SENSING DEVICE FOR AIR CONDITIONING SYSTEMS

BACKGROUND OF THE INVENTION

The present invention relates to the measurement of the flow of air in an air flow system, and is particularly concerned with providing more accurate measurement of the flow of air.

This invention also relates to an air volume regulator for use in an air conditioning system, and to providing more effective control over the regulation of air flow by obtaining a more accurate measurement of the air flow.

The type of air volume regulator with which the present invention may be employed has an air flow sensor mounted in the air flow for sensing the velocity of the air flowing through the regulator. The sensor is connected to a suitable control mechanism, which in turn, is connected to a damper mechanism. The damper mechanism is adjustably positioned in response to the air velocity sensed by the sensor so that the air flow discharged from the regulator is maintained at a substantially uniform volumetric flow rate regardless of variations in the pressure of the air being supplied to the air volume regulator.

Under ideal conditions, it would be desirable that the connecting duct supplying air to the air volume regulator be straight for a considerable length upstream of the regulator to establish a uniform, symmetrical air velocity distribution or profile within the connecting duct. This would insure that the air velocity measurement obtained by the air sensor would be representative of the air velocity conditions existing throughout the cross section of the duct.

Under the conditions which actually exist in field installations however, the connecting duct normally must undergo a number of bends or turns in leading from the main air supply duct to the individual air volume regulator. These bends and turns frequently produce a distorted, asymmetrical velocity distribution within the connecting duct which causes the air flow sensor to obtain an inaccurate measurement of the air flow in the duct and which results in inaccuracies in the regulation of the air flow.

The prior art has recognized the problem produced by flow disturbances and uneven velocity distributions upstream from a fluid flow sensor and the difficulty in obtaining an accurate flow measurement. Generally, the prior art has addressed this problem by mounting various types of stationary flow straighteners upstream from the flow sensor. Stationary flow straighteners have been proposed in the form of vanes, tubes, honeycomb elements, perforated plates, etc. By way of example, reference may be made to Preston U.S. Pat. No. 2,706,409; Sprenkle U.S. Pat. No. 2,929,248; and Goulet U.S. Pat. No. 3,981,193.

The prior types of stationary flow straighteners of which applicants are aware have a number of limitations which render them unsuited, or of limited usefulness, in air conditioning duct systems, and in particular in air volume regulator installations. For example, certain types of stationary flow straighteners must be mounted a considerable distance upstream from the flow sensor. This requires that the flow straightener either be mounted in the duct separately from the air volume regulator, or requires an undesirably large size regulator. Many of the known types of flow straighteners produce a significant flow obstruction and an undesirably high pressure drop which is unacceptable in many air conditioning installations. Further, because of the various ways in which air volume regulators can be installed and the various bends and turns which may be present in the upstream connecting duct, the velocity distribution of the air supplied to the regulator is completely unpredictable and the known stationary types of flow straighteners cannot take into account this unpredictability of the velocity profile.

SUMMARY OF THE INVENTION

The present invention provides for obtaining a more accurate reading by an air flow sensor when an uneven velocity distribution occurs at the sensor by positioning an air redirecting means in the air flow closely adjacent and preceding the sensor. The air redirecting means is mounted for movement in response to the impingement thereon of an air flow having an uneven velocity distribution so as to redirect the air flow and cause the air velocity reading obtained by the sensor to be more representative of the average air velocity conditions. Thus, regardless of the direction of the air flow path upstream from the sensor and the unevenness of the velocity distribution resulting therefrom, the movably mounted air redirecting means will be automatically repositioned so as to redirect the air flow for obtaining a more representative velocity distribution at the sensor.

The air redirecting means is constructed with surface portions laterally offset from the sensor in the air flow and oriented for redirecting air toward the sensor. Preferably, the air redirecting means is mounted for pivotal movement in the air flow and constructed so that impingement of the air thereon will pivotally reposition the air redirecting means in response to the uneven velocity distribution so as to redirect some of the air toward the sensor and to thereby provide a more representative and accurate measurement of the air velocity by the sensor.

The air redirecting means of this invention is designed to be mounted only a short distance upstream from the air flow sensor to avoid the need for an oversize housing or for separately mounting the redirecting means in the duct upstream from the air flow sensor. The redirecting means is constructed so as to present a minimum obstruction to air flow to thereby avoid causing an undesirable pressure drop in the air flow system.

In the embodiment of the invention illustrated herein, the air redirecting means comprises a pivotally mounted circular ring located in coaxial alignment with the sensor and mounted on a pivotal axis extending diametrically of the ring. The ring is of frusto-conical configuration with the walls thereof converging in the downstream direction and oriented for redirecting the air flow impinging thereagainst inwardly and toward the sensor. An uneven air velocity distribution impinging upon the ring will pivotally reposition the ring so that the portions exposed to the higher velocity air will be oriented for redirecting some of the higher velocity air toward the sensor.

The air redirecting means of this invention can be advantageously utilized in a number of specific applications in air flow systems where it is desirable to obtain a more accurate measurement of the air velocity in an air flow system. One particularly useful application of the air redirecting means is in an air volume regulator of the type which includes an air flow sensor, a damper assembly mounted for adjustably restricting the flow of air through the regulator housing, and a control unit associated with the sensor and with the damper for effecting adjustment of the damper assembly in response to the air flow through the regulator housing so as to regulate the air flow and deliver a substantially constant volume air flow regardless of fluctuations in the pressure of the air being supplied to the regulator. In this type of regulator, inaccurate measurement of the air flow by the sensor will result in inaccurate control over the volumetric flow rate of the air discharged from the regulator. The air redirecting means of this invention provides more effective control over the regulation of air flow by obtaining a more accurate measurement of the air flow by the sensor.

BRIEF DESCRIPTION OF THE DRAWINGS

Some of the objects and features of the invention having been described, others will become apparent as the description proceeds when taken in connection with the accompanying drawings, in which—

FIG. 1 is a perspective view of an air distribution unit embodying the present invention;

FIG. 2 is a cross sectional view of the air distribution unit taken substantially along the line 2—2 of FIG. 1;

FIG. 3 is a cross sectional view taken substantially along the line 3—3 of FIG. 1;

FIG. 4 is a cross sectional view of the inlet portion of the air distribution unit showing the air redirecting element;

FIG. 5 is a cross sectional view of the inlet portion of an air distribution unit showing an alternate embodiment of the invention; and FIG. 6 is a detailed perspective view more clearly showing the air redirecting element and air sensor in accordance with the embodiment of the invention of FIG. 5.

DESCRIPTION OF ILLUSTRATIVE EMBODIMENTS

Referring now more particularly to the drawings, FIG. 1 illustrates an air distribution unit or terminal box adapted for being installed in a central air conditioning system for controlling the flow of conditioned air into an air conditioned room or zone. The air distribution unit illustrated comprises an air volume regulator adapted for providing a substantially constant volume flow of air therefrom regardless of variations in pressure of the air being supplied thereto. The air distribution unit is conventionally mounted in the space above a suspended false ceiling and is connected to a main air supply duct by a connecting duct, such as the flexible connecting duct 11 illustrated. Depending upon the particular installation, the connecting duct may undergo one or more turns or bends in leading from the main supply duct to the air distribution unit. For convenience of illustration, only a single bend is shown in the connecting duct 11 but it will be understood that the number of bends and the direction thereof will vary with each distribution unit depending upon its location and orientation with respect to the main air supply duct.

The air distribution unit includes an elongate generally rectangular hollow housing 12 having opposing pairs of side walls 13 and an end wall 14 at the upstream end thereof. A circular air inlet opening is formed in the upstream end wall 14, and a cylindrical collar 15 extends outwardly from the end wall 14 in surrounding relation to the opening to form a cylindrical air inlet passageway for the air distribution unit. Collar 15 further serves to facilitate securement of the flexible connecting duct 11 to the air distribution unit. The downstream end of the housing serves as an air outlet opening and is adapted to be connected to suitable ducts or diffusers for distributing the air into the air conditioned room or zone. As is conventional, the inner surfaces of the walls 13 may be covered with a suitable thermal and sound insulating material 16.

Located between the inlet and outlet openings of the air distribution unit is a damper assembly, generally indicated by the reference character 20, which extends completely across the path of air flow for controlling the amount of air permitted to pass from the inlet to the outlet.

An air flow sensor, indicated by the reference character 30, is mounted in the housing in the path of air flow for sensing the velocity of the air flowing therethrough. In the preferred embodiment of the invention illustrated herein, sensor 30 is located upstream from the damper assembly 20 and near the air inlet for sensing the velocity of the air as it enters the air distribution unit. However, in certain types of distribution units it may be desirable or more convenient to position the sensor at other locations, such as downstream of the damper assembly for example.

The sensor 30 is connected to the input of a control unit 31, which, in turn, has its output connected to a motor 32 mounted on the exterior of the housing. The actuator arm of motor 32 is connected, through mechanical linkage 33, to the damper assembly 20. The sensor 30 and control unit 31 operate so as to adjustably position the damper assembly 20 in response to variations in air velocity sensed by the sensor so that a substantially uniform volumetric flow of air is discharged from the air distribution unit regardless of variations in the pressure of the air delivered to the unit by the connecting duct 11.

In order to provide a desirably high accuracy of control by the air volume regulator, it is important that the air velocity measurement obtained by the air flow sensor 30 be representative of the velocity conditions throughout the entire flow area where the sensor is located. If the velocity distribution is uneven, i.e. asymmetrical at the sensing location, then an inaccurate reading of the air flow may be obtained. In order to obtain a more accurate air flow measurement by the sensor, an air redirecting element, indicated by the reference character 40, is mounted closely adjacent and preceding the air sensor 30 in the path of air flow. The air redirecting element 40 is mounted for movement and so constructed that impingement of the air thereon will adjustably reposition the element in response to the uneven velocity distribution so as to redirect some of the air flow and provide a more uniform air distribution at the sensor.

In the preferred form of the invention illustrated herein the air redirecting element 40 is in the form of a pivotally mounted annular ring. It is positioned in the cylindrical flow passageway defined by collar 15 and located a short distance upstream of the sensor 30. A rod 41, mounted in a vertically extending orientation in collar 15, extends diametrically through the ring-like element 40 and serves to pivotally mount the element in the cylindrical air inlet passageway defined by collar 15. Tubular spacers 42, carried by rod 41 and located on opposite sides of the ring-like element 40, serve to position element 40 in spaced relation from the walls of collar 15 and centered in the collar in coaxial alignment with the sensor 30.

The ring-like element 40 is of frusto-conical configuration and oriented with the walls thereof converging in the downstream direction. The semicircular halves of element 40 located on opposite sides of the pivotal axis are laterally offset from the sensor on opposite sides thereof, with the interior surfaces 40a, 40b of each half being oriented to redirect the air impinging thereagainst inwardly toward the sensor.

Abutment stops 43 are secured to the wall of collar 15 and extend inwardly therefrom for engaging the pivotally mounted element 40 and limiting the pivotal movement thereof. As best seen in FIG. 4, the abutment stops 43 permit element 40 to undergo a maximum pivotal movement of only a few degrees, preferably no more than about 15 to 20 degrees.

The air redirecting element 40 should desirably be of a relatively small surface area in relation to the flow area of the air passageway where it is mounted so as to avoid causing a significant flow obstruction and an undesirable pressure drop. Preferably, the surface area of the redirecting element should be no more than about one-fourth of the cross sectional area of the flow passageway where the redirecting element is mounted, and most desirably should be no more than about one-fifth.

The following table sets forth several exemplary but nonlimiting examples of size relationships which have been empirically determined as being most suitable for use in the type of air volume regulator construction illustrated in this application. Referring to FIG. 4, the dimension A represents the diameter of the cylindrical air inlet passageway, and the dimensions B and C represent the major and minor diameters, respectively, of the air redirecting element 40. All dimensions are in inches.

TABLE

| A | B | C |
|---|---|---|
| 4 | 3 | 2¼ |
| 6 | 4 | 3¾ |
| 8 | 5¼ | 4¾ |
| 10 | 5¼ | 5 |

The operation of the air redirecting element 40 will best be understood from FIG. 2. As illustrated therein, the connecting duct 11 undergoes a relatively sharp bend just upstream of where it is connected to the cylindrical collar 15. As the air flowing in the connecting duct 11 reaches this bend, it will have a tendency to resist the sudden change of direction caused by the sharp bend, with the result that a greater proportion of the air will flow along the outer, larger diameter radius than along the inner, smaller diameter radius. This is indicated diagrammatically in FIG. 2 by the arrows. The air velocity distribution or profile will thus be uneven, or asymmetrical, as the air enters the air inlet passageway and flows past the sensor 30. In the absence of the redirecting element, the velocity reading obtained by sensor 30 under these conditions would not be representative of the air velocity throughout the entire flow area. The redirecting element 40, however, serves to collect and redirect some of the higher velocity air toward the sensor 30 to thereby obtain a more representative and accurate measurement of the air flow conditions.

As illustrated, the redirecting element 40 has been pivotally moved by the air flow and has come into engagement with one of the abutment stops 43. This pivotal movement of the redirecting element is brought about by the flow of air impinging on the interior surfaces 40a, 40b of each half of the element. Since the air flowing against the surface 40a of the redirecting element is of greater velocity than the air flowing against the opposing surface 40b, the air flow has pivotally repositioned the air redirecting element and moved the surface 40a in the downstream direction and in an orientation for redirecting the air impinging thereagainst inwardly and toward the sensor 30. The surface 40b on the opposite side redirects relatively little air toward the sensor since the air impinging thereagainst is of relatively low velocity as compared to the opposite side, and since it is oriented nearly parallel to the air flowing thereby. It will be understood that if the connecting duct 11 were to extend in a direction opposite that shown in FIG. 2, the redirecting element 40 would automatically be repositioned so as to again redirect some of the higher velocity air toward the sensor. In a similar manner, if the connecting duct were to extend downwardly, upwardly, or at any angle, the redirecting element would be automatically repositioned at the proper angular orientation in response to the particular uneven characteristics of the velocity distribution at the redirecting element so as to thereby provide a more uniform velocity distribution at the sensor. Should the velocity distribution of the air be substantially uniform, the redirecting element will still serve to redirect some of the air toward the sensor and to provide a more representative and accurate measurement of the air velocity over the entire cross sectional flow area.

Referring now more specifically to the construction of the air volume regulator illustrated, it will be seen that an inner conduit 17 is positioned within the housing 12 in communication with the connecting duct 11. Conduit 17 is carried by the upstream end wall 14 of housing 12 and extends therefrom in a cantilever manner into the interior of the housing in spaced relation from the side walls 13 thereof and from the insulating material 16. The damper assembly 20 is carried by the inner conduit 17 adjacent the downstream end thereof and extends entirely across the path of air flow through the inner conduit.

The damper assembly is particularly constructed to minimize any change of direction of the air as it passes through the air distribution unit and to thus reduce air turbulence and maintain the noise level of the air passing through the distribution unit as low as possible. To this end, the damper assembly 20 is constructed of a series of side-by-side elongate damper blades 21. The blades 21 are pivotally mounted along respective spaced parallel axes and interconnected by linkage 22 so that adjacent blades pivot in opposite directions and move through a relatively small angle from a fully open position wherein the blades are oriented generally parallel to one another and to the direction of air flow, to a fully closed position wherein the blades have their proximal longitudinal edges positioned in abutting relation with one another to obstruct the flow of air through the housing. The blades are moved between the open and closed position by motor 32. In the illustrated embodiment of the invention, motor 32 is of the pneumatic type, but it is contemplated that other types of motors, such as electric motors for example, could be used in some installations.

The air flow sensor 30 is mounted by a mounting support 34 approximately in the center of the cylindrical air passageway defined by collar 15, with the upstream end of the sensor being located at the juncture between the cylindrical collar 15 and the upstream end wall 14 of housing 12. The sensor has a hollow tubular interior oriented in the direction of air flow for receiving a sample of the air flowing along the duct, and with a sensing device located interiorly of the tubular portion of the sensor for measuring the velocity of the air and providing a control signal to a control unit 31. The preferred type of sensor is a pneumatically operated device known as a "fluidic flow sensor." This type of sensor is particularly suited for measuring relatively low velocity currents of air such as are carried by an air conditioning duct. With this type of sensor, air velocity is measured as a function of the amount of deflection caused by the duct air on a small jet of air directed transversely to the air flow in the duct. A suitable commercially available fluidic flow sensor of this type is the "Velocitrol" sensor available from Honeywell, Inc. Another type of pneumatically operated sensor which may be suitably employed in the present invention is the differential pressure type of sensor. In this type of sensor velocity is measured as a function of the difference between the static pressure and the total pressure in the duct. An example of this type of sensor is the Pitot tube. A number of sensors which operate on this principle are available commercially. It is also contemplated that the sensor may be of the electrically operated type.

The control unit 31 receives the velocity signal from sensor 30 and provides a modulated pneumatic signal for operating pneumatic motor 32. Motor 32 opens or closes the damper assembly 20 in response to variations in air velocity sensed by sensor 30 so that a substantially uniform volumetric flow rate is discharged from the air distribution unit regardless of variations in the supply air. Suitable control units of this type are available commercially from several suppliers. By way of example, a control unit particularly designed for use with the Honeywell "Velocitrol" sensor is available from Honeywell, Inc.

The control unit 31 may be used either with or without a thermostat. When used without a thermostat, the control unit operates to maintain the volumetric flow rate of the air substantially constant at a regulated manually preset set point. If desired, the control unit may be connected to a thermostat located in the room or zone being served by the air distribution unit. In this installation, the thermostat functions to vary the set point of the control unit to thereby increase or decrease the regulated flow of air to the room depending upon the temperature conditions in the room.

Under some conditions, particularly in larger air distribution units, unusual pressure or flow conditions have been observed downstream from the sensor, which conditions sometimes interfere with obtaining an accurate reading from the sensor. These conditions are believed to be caused by the path of movement of the air toward and through the damper blades. In accordance with an ancillary feature of this invention, as illustrated in FIGS. 5 and 6, the effect of such abnormal flow conditions downstream of the sensor is minimized by positioning a baffle plate 36 a short distance downstream of the sensor 30. As illustrated, baffle plate 36 is mounted by the supporting member 34 for the sensor, and is positioned a short distance, e.g. about one inch, behind the downstream outlet end of the tubular portion of the sensor. This baffle member, when used in conjunction with the air flow redirecting element 40, further enhances the accuracy of the flow measurement obtained by the sensor.

The foregoing description of illustrative embodiments of the invention has shown how the present invention may be used in an air volume regulator for providing more effective control over the regulation of air flow by obtaining a more accurate measurement of the air flow. The particular type of air volume regulator illustrated herein is the preferred type of regulator presently contemplated for use with the invention, but it is not intended that the present invention be limited to this particular type of regulator. It will be understood from the foregoing illustrative description that there are a number of other specific applications, besides air volume regulators, where the present invention can be effectively used for obtaining a more accurate measurement of air velocity in an air flow system.

In the drawings and specification, there have been set forth preferred embodiments of the invention, and although specific terms are employed, they are used in a generic and descriptive sense only and not for purposes of limitation.

That which is claimed is:

1. In an air distribution unit having a housing, damper means mounted in the housing for adjustably restricting the flow of air therethrough, an air flow sensor mounted for sensing the flow of air through the housing, and means cooperating with the air flow sensor and with the damper means for effecting adjustment of the damper means in response to the air flow through the housing to regulate the air flow and deliver a substantially constant volume air flow regardless of fluctuations in the pressure of the air being supplied to the housing, and wherein an inaccurate reading of the air flow may be obtained by the sensor because of an uneven air velocity distribution in the air being supplied to the housing, as may occur when there is a curved air flow path adjacent to and preceding the air distribution unit, the combination therewith of means for obtaining a more accurate sensor reading when an uneven air velocity distribution occurs at the sensor, said means comprising air redirecting means positioned in the air flow closely adjacent and preceding said sensor and being mounted for movement in response to impingement thereon of an air flow having an uneven velocity distribution to redirect the air flow and provide a more representative air velocity condition at the sensor.

2. An air distribution unit according to claim 1 wherein said air redirecting means is mounted for pivotal movement in the air flow and constructed so that impingement of the air thereon will pivotally reposition the air redirecting means in response to the uneven velocity distribution to provide a more representative air velocity condition at the sensor.

3. An air distribution unit according to claim 1 wherein said sensor is positioned upstream of said damper means and centrally located in the path of the air flow entering said housing, and wherein said air redirecting means has surface portions laterally offset from said sensor in the air flow and oriented for directing air toward the sensor.

4. An air distribution unit according to claim 3 wherein said air redirecting means comprises a pivotally mounted circular ring located in coaxial alignment with said centrally located sensor and mounted on a pivotal axis extending diametrically of the ring.

5. An air distribution unit according to claim 4 including means cooperating with said ring for limiting the pivotal movement of the ring.

6. In an air distribution unit having a housing, damper means mounted in the housing for adjustably restricting the flow of air therethrough, an air flow sensor mounted upstream of said damper means for sensing the flow of air entering the housing, and means cooperating with the air flow sensor and with the damper means for effecting adjustment of the damper means in response to the air flow through the housing to regulate the air flow and deliver a substantially constant volume air flow regardless of fluctuations in the pressure of the air being supplied to the housing, and wherein an inaccurate reading of the air flow may be obtained by the sensor because of an uneven air velocity distribution in the air being supplied to the housing, as may occur when there is a curved air flow path adjacent to and preceding the air distribution unit, the combination therewith of means for obtaining a more accurate sensor reading when an uneven air velocity distribution occurs at the sensor, said means comprising pivotally mounted air redirecting means positioned in the air flow closely adjacent and preceding said sensor for impingement of the air flow thereon and having surface portions laterally offset from said sensor in the air flow and oriented for directing the air toward the sensor, and said air redirecting means being constructed so that impingement of the air thereon will adjustably reposition the air redirecting means in response to the uneven velocity distribution to redirect the air flow toward the sensor and provide a more representative air velocity condition at the sensor.

7. In an air distribution unit having a housing including a cylindrical flow passageway adjacent the inlet end thereof, damper means mounted in the housing for adjustably restricting the flow of air therethrough, an air flow sensor mounted for sensing the flow of air through the housing, and means cooperating with the air flow sensor and with the damper means for effecting adjustment of the damper means in response to the air flow through the housing to regulate the air flow and deliver a substantially constant volume air flow regardless of fluctuations in the pressure of the air being supplied to the housing, and wherein an inaccurate reading of the air flow may be obtained by the sensor because of an uneven air velocity distribution in the air being supplied to the housing, as may occur when there is a curved air flow path adjacent to and preceding the air distribution unit, the combination therewith of means for obtaining a more accurate sensor reading when an uneven air velocity distribution occurs at the sensor, said means comprising a pivotally mounted air redirecting element in the form of a circular ring, said element being positioned in the air flow closely adjacent and preceding said sensor and in coaxial alignment therewith, said element being mounted for pivotal movement about an axis extending diametrically of the circular ring and being constructed so that impingement of the air on the ring will adjustably reposition the air redirecting element in response to the uneven velocity distribution to redirect the air flow and provide a more representative air velocity condition at the sensor.

8. An air distribution unit according to claim 7 wherein said air flow sensor and said circular ring are both located in said cylindrical flow passageway, said air sensor being centrally located in the cylindrical flow passageway and said circular ring being located upstream from said sensor and in coaxial alignment therewith.

9. An air distribution unit according to claim 8 wherein the surface area of said circular ring comprises a fraction of the cross sectional flow of said cylindrical flow passageway so as to avoid causing a significant flow obstruction and an undesirable pressure drop.

10. An air distribution unit according to claim 8 wherein said air redirecting element comprises a circular ring of frusto-conical configuration having walls converging in the downstream direction for redirecting the air flow impinging thereagainst inwardly and toward the sensor to provide a more representative air velocity condition at the sensor.

11. An air distribution unit according to claim 7 including a baffle plate positioned immediately downstream of said air flow sensor and extending transversely of the path of air flow across the sensor for minimizing the effects of any abnormal flow conditions downstream of the sensor and thereby serving to enhance the accuracy of the flow measurement obtained by the sensor.

12. In an air flow system having an air flow sensor mounted in the air flow path and wherein an inaccurate reading of the air flow may be obtained by the sensor because of an uneven air velocity distribution at the sensor, as may occur when there is a curved air flow path adjacent to and preceding the sensor, the combination therewith of means for obtaining a more accurate sensor reading when an uneven air velocity distribution occurs at the sensor, and means comprising air redirecting means positioned in the air flow closely adjacent and preceding said sensor and being mounted for movement in response to impingement thereon of an air flow having an uneven velocity distribution to redirect the air flow and provide a more representative air velocity condition at the sensor.

13. An air flow system according to claim 12 wherein said air redirecting means has surface portions laterally offset from said sensor in the air flow and oriented for directing air toward the sensor.

14. An air flow system according to claim 12 wherein said air redirecting means is mounted for pivotal movement in the air flow and constructed so that impingement of the air thereon will pivotally reposition the air redirecting means in response to the uneven velocity distribution to provide a more representative air velocity condition at the sensor.

15. An air flow system according to claim 14 wherein said air redirecting means is symmetrical about its pivotal axis and has a pair of air redirecting surfaces located on opposite sides of the pivotal axis and laterally offset from said sensor on opposite sides thereof and each being oriented for directing air toward the sensor.

16. An air flow system according to claim 12 wherein said air redirecting means is in the form of a circular ring, said ring being pivotally mounted on an axis extending diametrically of the ring and having surfaces positioned in the air flow for impingement of the air thereagainst, and said surfaces being oriented for redirecting the air toward the sensor.

17. In an air flow system having an air flow sensor mounted in the air flow path and wherein an inaccurate reading of the air flow may be obtained by the sensor because of an uneven air velocity distribution at the sensor, as may occur when there is a curved air flow path adjacent to and preceding the sensor, the combination therewith of means for obtaining a more accurate sensor reading when an uneven air velocity distribution occurs at the sensor, said means comprising a pivotally mounted air redirecting element in the form of a circular ring of frusto-conical configuration, said element being positioned in the air flow closely adjacent and preceding said sensor and in coaxial alignment therewith, said element being mounted for pivotal movement about an axis extending diametrically of the circular ring and said element having walls converging in the downstream direction and constructed so that impingement of the air on the walls will adjustably reposition the air redirecting element in response to the uneven velocity distribution to redirect the air flow toward the sensor and provide a more representative air velocity condition at the sensor.

18. An air flow system according to claim 17 including means cooperating with said ring for limiting the pivotal movement of the ring.

* * * * *

UNITED STATES PATENT AND TRADEMARK OFFICE
CERTIFICATE OF CORRECTION

PATENT NO. : 4,191,209
DATED : March 4, 1980
INVENTOR(S) : Frank J. Mattson, John T. Lawler
Jack L. Stegall It is certified that error appears in the above-identified patent and that said Letters Patent are hereby corrected as shown below:

Column 10, CLAIM 12, Line 31, "and" should be --said--

Signed and Sealed this

Tenth Day of June 1980

[SEAL]

Attest:

SIDNEY A. DIAMOND

Attesting Officer

Commissioner of Patents and Trademarks